(12) United States Patent
Sikora et al.

(10) Patent No.: US 6,263,297 B1
(45) Date of Patent: Jul. 17, 2001

(54) PROGRAMMED COMPUTATION OF PREDICTED LOADING OF SHIP HULL

(75) Inventors: Jerome P. Sikora, Rockville; Robert W. Michaelson, Annapolis, both of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/266,267

(22) Filed: Mar. 11, 1999

(51) Int. Cl.[7] .................................................. G01G 19/03
(52) U.S. Cl. ............................................................. 702/175
(58) Field of Search ............................... 702/33, 138, 175, 702/35, 34, 36, 38–39, 41, 42, 43, 75, 76, 169, 108, 113, 114, 167, 123–124, 140, 150–151, 154, 179, 181, 189, 183–184, 1; 405/1, 3

(56) References Cited

PUBLICATIONS

An investigation of the utility of computer simulation to predict ship structural response in waves, P. Kaplan et al. U.S. Coast Guard Headquarters, Washington, D.C. Jun. 1969.*

Load criteria for ship structural design, Edward V. Lewis et al. U.S. Coast Guard Headquarter, Washington, D.C. 1973.*

* cited by examiner

Primary Examiner—Patrick Assouad
Assistant Examiner—Khoi Hung Duong
(74) Attorney, Agent, or Firm—Jacob Shuster

(57) ABSTRACT

Low and high frequency components of ship bending loads are computed from sea trial testing data, respectively based on sea statistical properties and geometry of a model ship hull and cyclic wave impact on such model ship hull. The low and high frequency bending load components are combined through an algorithm controlled program to provide a more accurate prediction of cyclic bending loads experienced during the lifetime of a ship hull.

6 Claims, 1 Drawing Sheet

Programmed Computation of Predicted Loading of Ship Hull

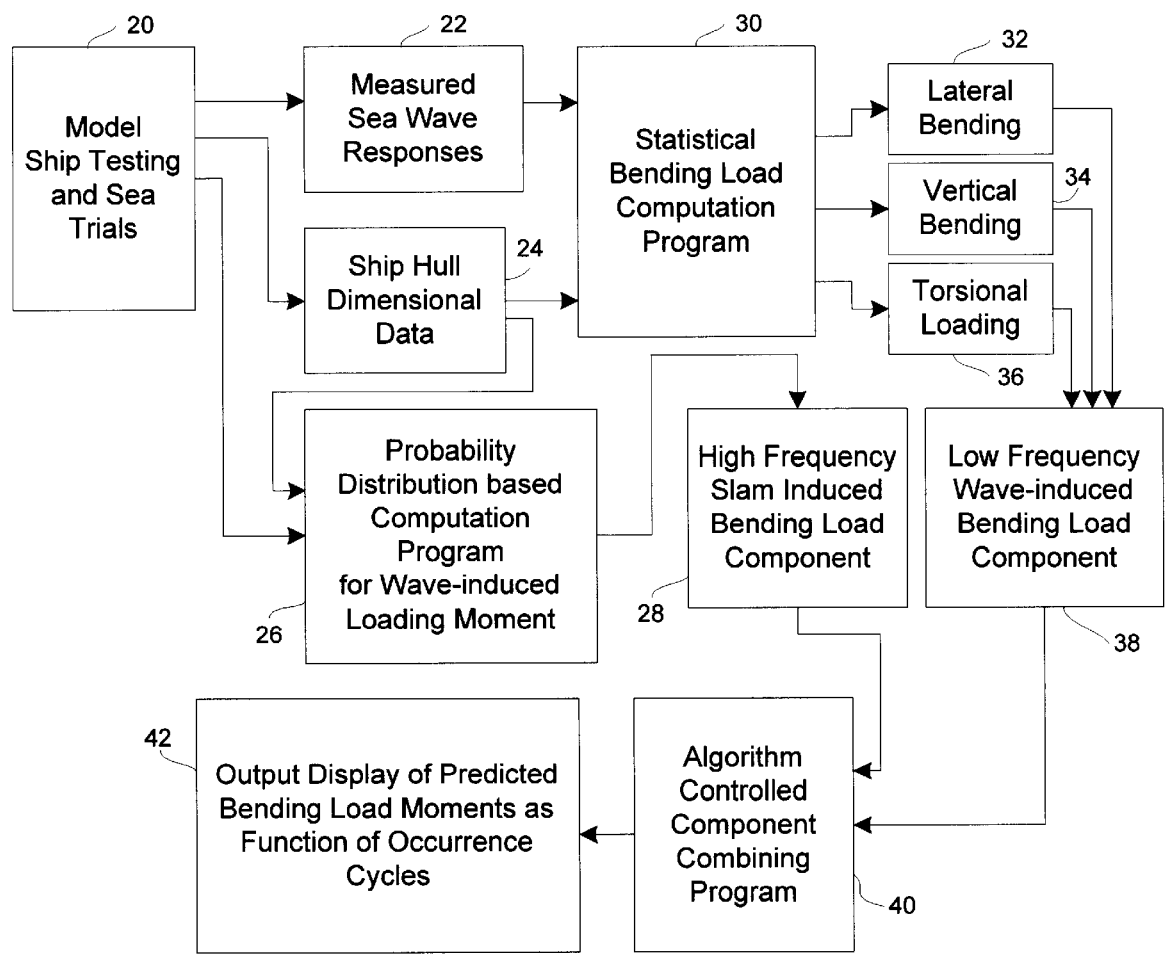

PROGRAMMED COMPUTATION OF PREDICTED LOADING OF SHIP HULL

The present invention relates to a method applicable to computer programming for predicting lifetime loading of a ship hull during exposure to seawater activity, for use in structural ship hull design.

BACKGROUND OF THE INVENTION

Marine vessels are subject to overall bending loads during seawater exposure due to waves acting on the ship hull, as described in a publication entitled "Cumulative Lifetime Loadings For Naval Ships", distributed Nov. 15–20, 1998 in Anaheim, Calif. at the 1998 exhibition symposium of the International Mechanical Engineering Congress, relating to "Unsteady Fluid Loading On Naval Structures". A copy of such publication is submitted herewith as an Appendix and its content is incorporated herein by reference.

Bending loads imposed on marine vessels as a result of seawater activity, have been classified under two principal components acting on the hull structure, consisting of a low frequency wave-induced loading component and a high-frequency slam loading component. Bending loads are currently predicted on the basis of the low frequency component using a simplified "static balance" type of computational method predicated on the assumption of a static equilibrium position for the ship hull on a hypothetical stationary ocean wave. However, such static balance methods for predicting bending loads actually experienced by a ship hull during its lifetime, has a serious shortcoming in failing to take into account various factors, including current statistical information on the sea utilized for low frequency bending calculation and the expected operating life of the ship, as well as the impact of seawater or ocean waves on the hull, referred to as high frequency slam loading. It is therefore an important object of the present invention to address the foregoing referred to shortcomings involving incorrect predictions in bending load magnitudes that a ship may actually experience during its lifetime.

SUMMARY OF THE INVENTION

In accordance with the present invention, slam-induced bending loads imposed on a model ship hull by wave impact is computed in terms of a high frequency loading component as a function of the ship hull geometry, based on probability distribution of maximized cyclic loadings under a program to which input data is supplied by sea trial testing of the model ship. Such computed high frequency loading component is combined with the low frequency loading component heretofore obtained from the same input data by a statistical computation program based on spectral integration of a statistical description of the sea and the ship's response to the sea. Such combining of low and high frequency loading components is performed by an algorithm controlled computational program to provide a bending load prediction output as a function of its occurrence cycles. Also, the distribution of such combined bending loads along the length of the vessel is computed.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein: a block diagram schematically illustrating the computational method of the present invention.

DETAILED DESCRIPTION OF PREFERRED EMBODIMENT

Referring now to the drawing, it diagrams a computational program pursuant to the methodology of the present invention associated with a model ship hull on which a low frequency wave-induced component of bending loads is theoretically imposed due to ocean waves acting thereon, was heretofore predicted by statistical computation for use in ship hull design. In accordance with the present invention, an additional high frequency slam component of the ship hull bending loads is computed and combined with the low frequency wave induced component in order to provide a more accurate estimate or prediction of hull bending moments the ship will experience in its lifetime to thereby provide for hull design that will yield safer ship structures. The high frequency slam component of the bending loads relates to ocean wave impact on the ship hull causing a high frequency bending vibration thereof so as to increase the actual bending moment experienced by the ship hull.

The computational method involving computer programming, modified in accordance with the present invention for providing the more accurate prediction of hull bending moments as diagrammed in the drawing. The computational inputs are derived from testing and sea trials of a model ship, as denoted by reference numeral 20, to provide in addition to measured sea wave response 22 and dimensional data 24 on the model hull, a probability distribution in accordance with a program 26 for computing wave-induced loading moment as a function ship hull geometry, from which the high frequency slam-induced bending load component 28 is derived. The computation of frequency component 28 accompanies the output of the statistical bending load program 30 on primary hull girder loadings involving lateral bending 32, vertical bending 34 and torsion 36 derived from the input parameters of sea wave responses 22 and model hull dimensional data 24. As also diagrammed, the loading outputs 32, 34 and 36 from program 30 provide for determination of the low frequency wave-induced bending load component 38, accompanying the high frequency slam-induced component 28 as inputs to an algorithm controlled component combining program 40 from which an output display 42 is derived on predicted hull bending moments as a function of occurrence cycles.

According to one embodiment of the computational program 30, the ship's lifetime exposure at sea is divided into stochastic cells having given spectral wave shapes corresponding to the operational and environmental characteristics of ships in terms of statistical parameter values which do not change with time. Each cell is defined by a range of wave heights with respect to the ship hull, a range of speeds and a range of directional headings. Determination of low frequency moments for the wave-induced conditions represented by each cell, such as the loads acting upon conventional monohull vessels involve calculation of Response Amplitude Operators (RAO), as root factors for each heading and speed range. Such root factors (RAO) are alternatively determined experimentally from the sea trials 20, analytically from some hydrodynamic computer code, or by empirically derived algorithms respectively developed for each of the ship hull loads, such as the lateral bending 32, vertical bending 34 and torsion 36, applied to a midship location on the hull 10 as summarized in the following table:

| Factor | Vertical Bending Moment Factors | Lateral Bending Moment Factors | Torsional Moment Factors |
|---|---|---|---|
| D Dimensional Normalization | $pgL^2B$ | $pgL^2\sqrt{BT}/(C_b + 0.25)$ | $C_T pg^2 B^2/T$ |
| $F_1$ Heading Factor for Magnitude | $\|(\cos\theta)^{0.3333}\|$ | $1.1(0.3 + \sin 2\theta)^* \exp(-\cos_2\theta)$ | $[3-2\cos X + \theta(1 + \cos X)/360]$ |
| $F_2$ Speed Factor for Magnitude | $1.0 + C_{speed} V$ | $1.0 + C_{speed} V$ | $1.0 + C_{speed} V$ |
| $F_3$ Heading Factor for Wave Frequency | $(\cos\theta)^{0.5}$ | $\cos\theta + 0.275 \sin^2\theta$ | $1.0 - 0.58 \tanh [1.0 -((90 - \theta)/90)^2]$ |

Where

L=ship length between perpendiculars

B=maximum beam at waterline

T=mean draft $C_b$=block coefficient $C_{speed}$=speed coefficient (Table 1)

$C_T$=torsional coefficient (0.0313 for containerships and 0.043 for closed ships)

pg=density of seawater (e.g. 0.0286 ltons/ft$^3$)

$X=\theta^2/5 \ln(\theta+1.001)$ $\theta$=ship heading (degrees), 0°=head seas

V=ship speed (knots)

At locations along the length 16 of the ship hull 10, other than the midship location, a 1-cosine distribution of the algorithm root factors (RAO) is assumed. Furthermore, the algorithm root factors for heading and speed can be applied to a limited database of experimental or analytically derived root factor values to fill in missing operational conditions for a more accurate computation of the low frequency component 38 at the cell level.

The program 26 as diagrammed in the drawing takes into account ship hull girder loading by slamming forces resulting from impacting sea water waves causing high frequency bending vibration of the hull. Such slamming events do not occur at every wave encounter so that slam rate algorithms have been developed to follow corresponding distribution of wave whipping moments from measurements obtained by ship model testing and sea trials 20. In accordance with the present invention, such wave whipping moments, reflected in the high frequency slam induced bending load component 28, are combined with the low frequency wave-induced bending load component 38 at the cell level by the algorithm controlled program 40.

The maximum moment (M) of wave-induced vertical bending 34 reflected in component 38 for each cell is combined with the whipping moment (m) of component 28 to obtain as a result of the combining program 40 the maximum total moment (CM) in accordance with the following algorithms respectively associated with a ship hull hogging wave and sagging wave.

$$CM_{HOG}=M_{HOG}+SW+0.5\ W_{p-p}\ \exp(-\delta R[\phi+80]/360)$$

$$CM_{SAG}=M_{SAG}+SW+0.75\ W_{p-p}\ \exp(-\delta R\phi/360)$$

where:

SW is the stillwater bending moment;

R is the ratio of whipping frequency;

$\phi$ is the phase angle between slamming event and peak of the next wave induced sag cycle; and ChV is the characteristic value of a three parameter distribution; and $x_o$ is a truncation value of distribution.

where:

nWi is the number of slam events in a cell;

chv is the characteristic value of a three parameter distribution; and

Xo is a truncation value of such distribution.

As to the whipping effect on lateral bending 32 reflected in component 38, it is initiated just before a peak in the lateral wave cycle. Thus, the total lateral bending moment (CLM) is approximated as:

$$CLM=LM_{amplitude}+0.5\ LW_{p-p}.$$

As a result of the foregoing described computational method, a more accurate estimate is obtained of maximum hull girder bending moments a ship will experience during its lifetime, involving loadings resulting from vertical and lateral bendings and torsion for both wave buoyancy and slam-induced whipping derived from an extensive database of sea trial measurements. Such computational method thereby provides a consistent approach for taking into account both extreme lifetime loads and cumulative fatigue loadings.

Obviously, other modifications and variations of the present invention may be possible in light of the foregoing teachings. It is therefore to be understood that within the scope of the appended claims the invention may be practiced otherwise than as specifically described.

What is claimed is:

1. In a method for estimating lifetime bending loads experienced by a ship hull during exposure to seawater undergoing cyclic change, including measurement of responses to said exposure so as to obtain statistical loading values in terms of a low frequency wave-induced bending load component; the improvement residing in the steps of: computing a wave-induced loading moment from activity of said seawater in accordance with algorithms to obtain a high frequency slam-induced bending load component; and combining said low and high frequency components to obtain an output of predictions of bending load moments imposed on the model ship hull as a function of occurrence cycles reflecting said cyclic change in the seawater activity.

2. The improvement as defined in claim 1, wherein said step of combining the low and high frequency components includes: computationally modifying the statistical loading values of the low frequency component relating to vertical and lateral bending in accordance with the high frequency component to obtain maximum total bending moments corresponding to the lifetime bending loads experienced by the model ship hull.

3. The improvement as defined in claim 2, wherein said algorithms are a function of the model ship hull geometry.

4. The improvement as defined in claim 1, wherein said algorithms are a function of the model ship hull geometry.

5. In a method for predicting loading experienced by a model ship hull by computation of low frequency bending component based on statistical data collected during sea trial testing of the model ship hull, the improvement residing in the steps of: computing a higher frequency loading component based on probability distribution of loads resulting from wave impacts on the model ship hull during said sea trial testing; and combining the low frequency and the higher frequency loading components to provide a predicted loading output as a function of occurrence cycles of the wave impacts.

6. A method for predicting torsional loading arising from seawater activity including wave impacts along a length of a model ship hull, the improvement residing in the steps of: computing a low frequency loading component in accordance with algorithms developed from the model ship hull and sea trial testing; and utilizing the low frequency loading component to provide a predicted loading output as a function of occurrence cycles of the wave impacts.

* * * * *